Figure 1:
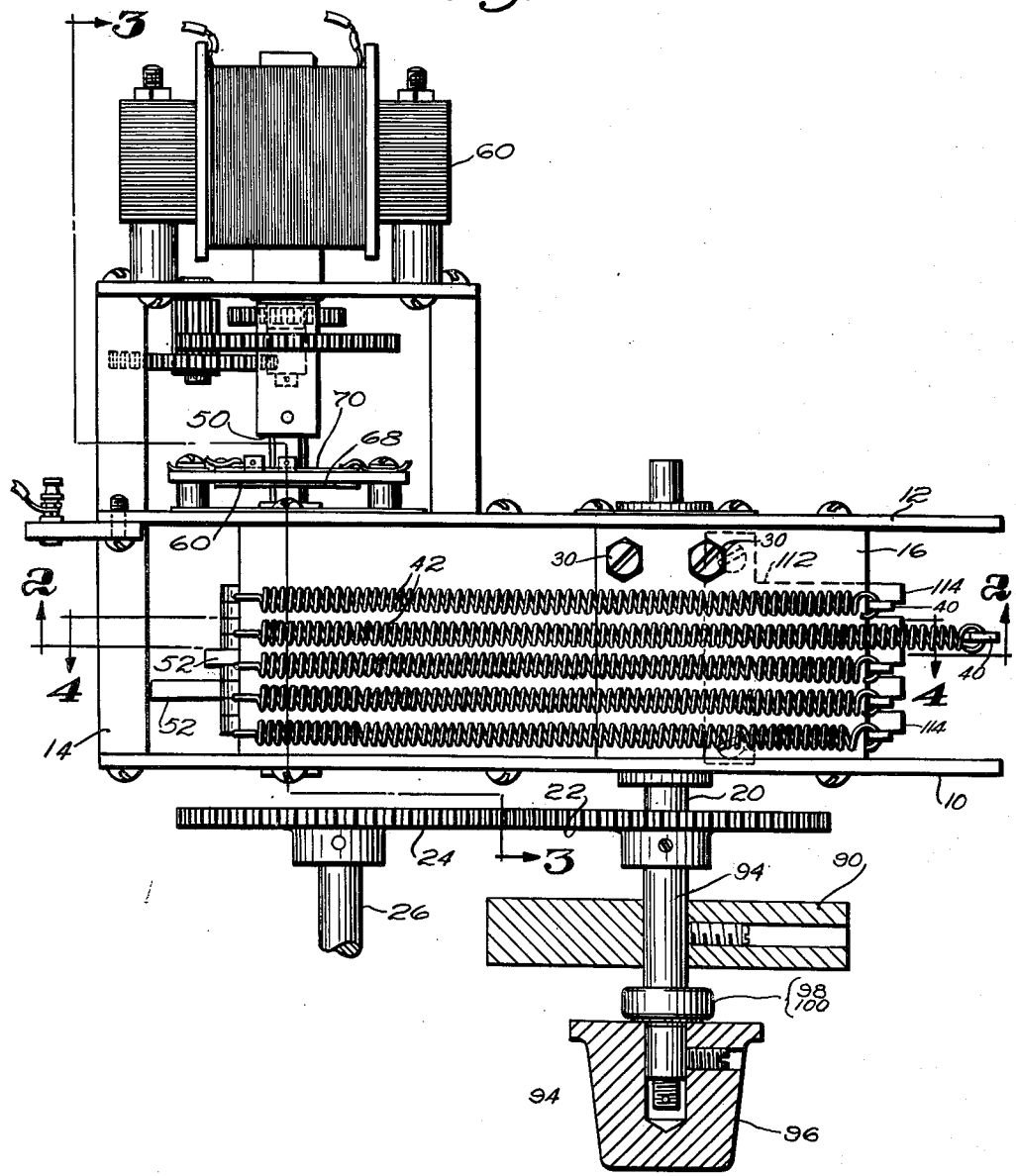

Feb. 10, 1953     R. W. MAY     2,627,957
SHAFT POSITIONING APPARATUS

Filed June 20, 1950     4 Sheets-Sheet 1

Inventor:
Richard W. May,
by Emery, Booth, Townsend,
Miller & Weidner, Attys

Feb. 10, 1953
R. W. MAY
2,627,957
SHAFT POSITIONING APPARATUS
Filed June 20, 1950
4 Sheets-Sheet 2
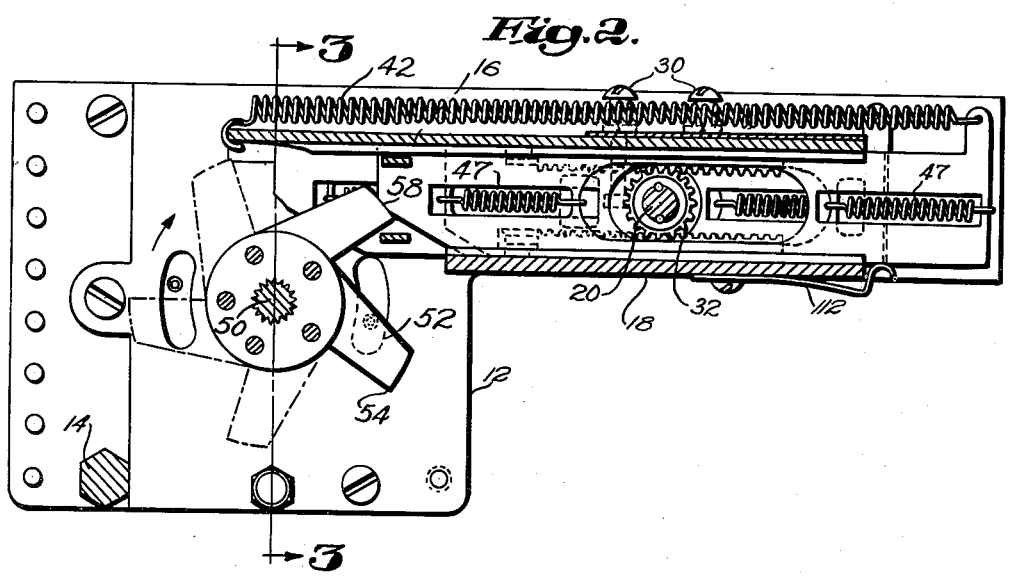
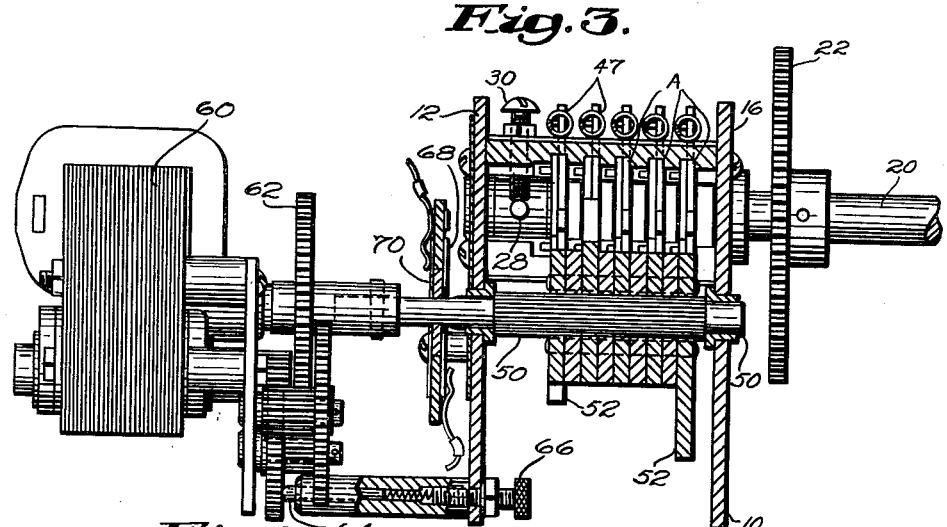
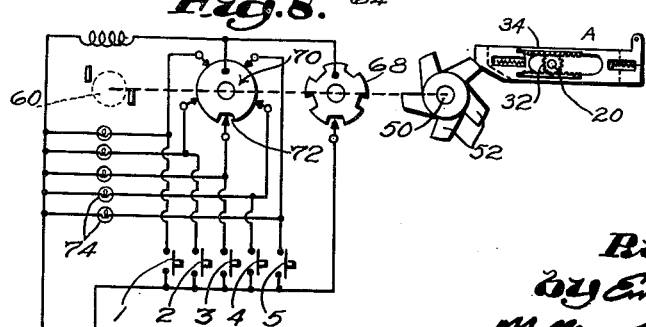
Inventor:
Richard W. May,
by Emery, Booth, Townsend,
Miller & Weidner Attys

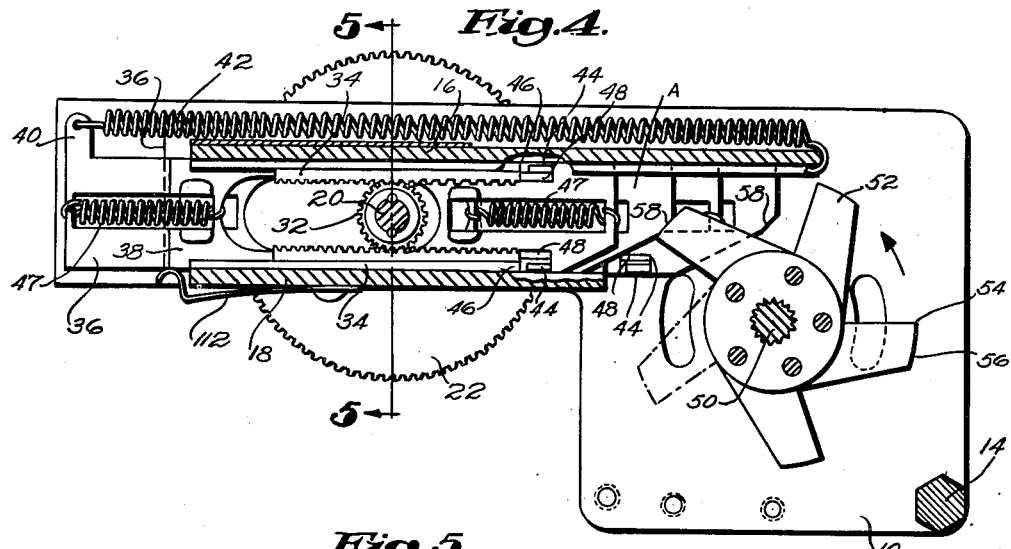
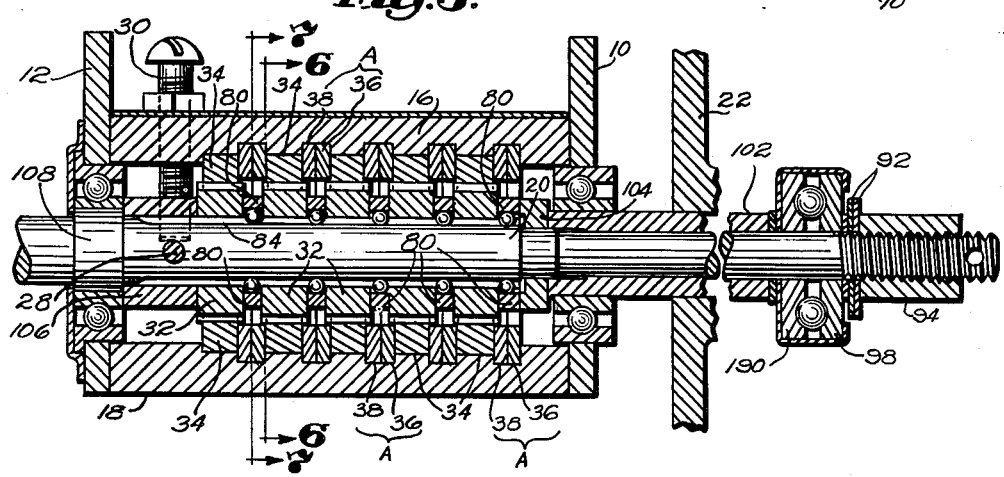
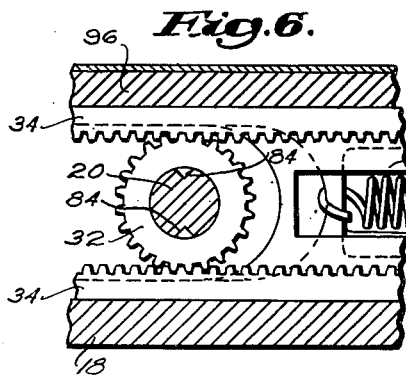
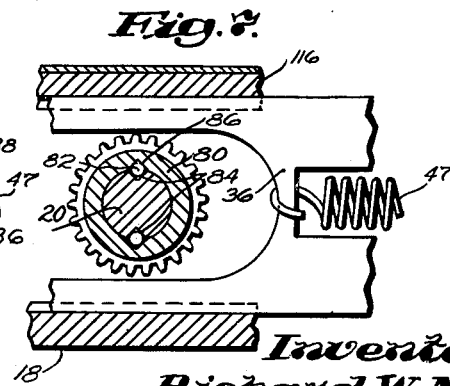

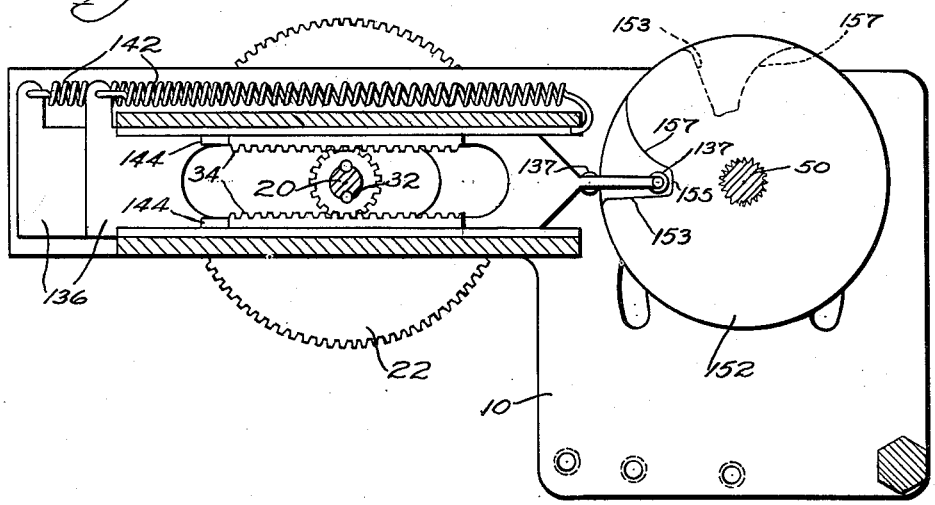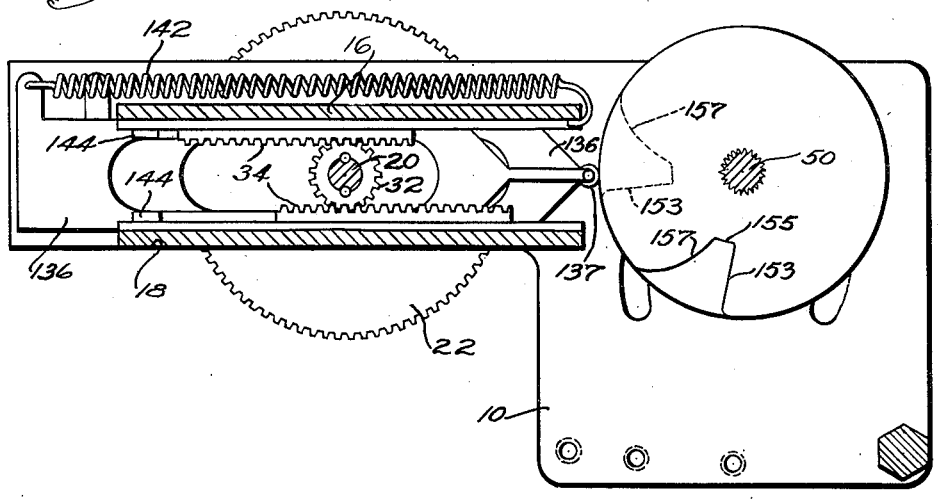

Patented Feb. 10, 1953

2,627,957

UNITED STATES PATENT OFFICE 2,627,957

SHAFT POSITIONING APPARATUS

Richard W. May, Lexington, Mass., assignor to National Company, Inc., Malden, Mass., a corporation of Massachusetts Application June 20, 1950, Serial No. 169,208

12 Claims. (Cl. 192—142)

This invention relates to shaft positioning devices whereby, as a result of a controlling operation (for example the manual positioning of a switch arm or the depression of a push button) a shaft is brought to and stopped in a selected one of several predetermined angular positions. The movement of the shaft to its desired position may, as in the apparatus herein illustrated and to be described in detail, be effected by power. A particular and extensive field of use for such a device is in the field of radio wherein tuning to a predetermined frequency is desired. In such an application, for example, the angular movement of the shaft might effect a corresponding angular adjustment of a condenser.

In the complete mechanism shown means are provided whereby in response to a selective, manually effected governing control, the shaft is moved under power through a series of predetermined positions and stopped at the selected one. The mechanism provides coordinated improvements for positioning the shaft by variable amounts responsive to driving movements of constant, predetermined stroke and also for varying as desired the predetermined positions of rest within the angular range of movement of the shaft.

My invention will be well understood by reference to the following description of the illustrative embodiment thereof shown by way of example in the accompanying drawings, wherein:

Fig. 1 is a plan view of the mechanism;
Fig. 2 is a section on the line 2—2 of Fig. 1;
Fig. 3 is a section on the line 3—3 of Fig. 2;
Fig. 4 is a section on the line 4—4 of Fig. 1;
Fig. 5 is a section, on a larger scale, on the line 5—5 of Fig. 4;
Figs. 6 and 7 are fragmentary, enlarged sections in the planes of lines 6—6 and 7—7 of Fig. 5 respectively;
Fig. 8 is a wiring diagram; and
Figs. 9 and 10 disclose a modification and are sections similar to Fig. 4, but simplified by the omission of parts, showing in elevation a pair of actuators in two different positions respectively.

Referring now to Fig. 1, and also to Figs. 2 and 5, the mechanism shown is organized in front and back frame plates 10 and 12 respectively which are spaced by pillars 14, and upper and lower guide plates 16 and 18 (see Fig. 5) hereinafter more fully to be described. Journalled to bearings (Fig. 5) in the plates is a shaft 20 to be positioned. In most applications this might be considered as the primary positioned shaft and its motion would be transmitted as by the gears 22 and 24, Fig. 1, to a secondary positioned shaft 26 which might itself be the shaft of the mechanism (for example a condenser) which it is desired to operate, or might drive such a shaft through further mechanical connections. The range of movement of the shaft 20 in the present instance is through approximately 180° and I have here shown (see Fig. 5) a cross pin 28 extending through the shaft and cooperating with stopscrews 30 to limit the movement of the shaft.

In the example of the invention shown the shaft 20 has five positions of angular adjustment and is moved to these positions by five corresponding driving pinions 32, to permit the angular adjustment of the pinions relatively to the shaft and thus the initial selection and subsequent change if desired of the rest positions of the shaft. These pinions 32 are not in themselves connected to the shaft, but fit thereon with slight frictional engagement not effective to transmit considerable load. This permits their rotative adjustment about the shaft 20 and means hereinafter to be described provides for locking the pinions in fixed position on the shaft. For the present it will be convenient to consider the pinions as fixed to the shaft. Meshing with each of the pinions 32 at opposite sides thereof, are upper and lower loose racks 34. Herein where the range of movement of the shaft is substantially 180° the length of these racks is desirably only slightly greater than the pitch circumference of the pinions. Referring now to Fig. 4, when the shaft 20 is positioned at a selected position the corresponding pinion 32 by means of which it was turned to that position is centered on the racks 34. This may be considered the neutral position of the parts. If the racks were not restrained and the shaft 20 were turned clockwise viewing Fig. 4, the upper rack would move to the right and the lower rack to the left. If it were moved counterclockwise the upper rack would move to the left and the lower to the right. With one set of racks in the centered position of Fig. 4 the others may be in any position relative to their pinions and if the shaft is free the movement of a rack from a position relatively displaced toward the right in Fig. 4 would turn the shaft counterclockwise if it is the upper rack which is moved to the left toward the centered position, and clockwise if it is the lower rack.

In the preceding paragraph I have referred to the pinion as centered on the racks. This is true of the construction as illustrated in the drawings, and desirably for any commercial construction the parts would be so centered or substantially so. In a sense, however, such centering is not necessary, and I shall return to this later after further description will make a fuller discussion possible. I shall however throughout the specification use this language, believing that it will promote ready understanding of the operation, but it must be understood in the light of the discussion referred to and which will follow.

To move the shaft to its selected positions means are provided for moving the racks of the corresponding pinions from such uncentered positions to the centered position. This is effected herein by sliding actuators A of fixed stroke. I have used the letter A instead of a reference numeral to designate these actuators since they are composed of two parts, but it will be convenient to consider them as one to understand their general rule of action, and for such consideration a single identifying designation is convenient.

I shall however at this place describe the two part construction of these actuators A. This description might be considered parenthetical in this place, and the present paragraph and the next might be skipped if a quick outline of the operation is desired, and returned to later. Each actuator A comprises two flat plates or slides 36 and 38 the edges of which are received in relatively deep grooves in plates 16 and 18 at one side of the racks 34 which the actuator moves. The plates have central openings to permit the passage of the shaft 20 and to permit the longitudinal movement of the actuator relative thereto. The plate 36, which is at the right in Fig. 5 and at the rear in Fig. 4, has an ear 40 cooperating with the right-hand end of the upper guide plate 16 viewing Fig. 1 (left-hand end, Fig. 4). See the three lower and the upper actuators in Fig. 1. These ears limit the movement of the plates to the left in that figure, the plates being drawn to this extreme left-hand position by light springs 42. Displacing force is exerted on the opposite end of the plate 34 to move it to the position of the actuator second from the top in Fig. 1, this being effected by a cam 52 acting thereon as later described.

The plate 38 which lies at the left in Fig. 5 or toward the rear in Fig. 4, rests against plate 36. The plate 36 has lugs 44 entering relatively long notches 46 on the edges of plate 38. Relatively strong springs 47 tend to position the parts with the lug 44 at the right-hand ends of notches 46 viewing Fig. 4. into the position shown by the parts 44 and 46 appearing at the right of the figure and forming parts of an actuator at the rear. If the movement of plate 38 toward the left is arrested, as hereinafter explained, the plate 36 under the action of the cam may continue to move to the left against the force of the springs so that the parts 44 and 46 come to the position shown more to the left of the figure as parts of the actuator at the front. The plate 38 has lugs 48 projecting laterally therefrom across the paths of the racks 34 which are adjacent thereto.

For the moment we may consider the actuators A as unitary slides normally drawn to the right, viewing Fig. 4, by the springs 42 and having lugs 48 extending across the paths of the adjacent racks 34. When these slides are in such normal position as shown by those at the rear in Fig. 4, the lugs 48 are at least as far to the right as the racks can be moved by their pinion. If the actuator is now given a sliding stroke of predetermined length toward the left, it picks up whichever rack is extended toward it and returns the two to the centered position shown in full lines in Fig. 1. If the upper rack were the one extended toward the right the pinion would be turned counterclockwise. If the lower were the one so extended the pinion would be turned clockwise. The angular measure of the movement in either instance depends upon the position of the rack when the movement of the actuator commences.

I now come, as mentioned previously, to a discussion of the statement that in the position of Fig. 4 the pinion is centered on the racks. For compactness the length of the racks will correspond closely to the circumference of the pinion with an additional tooth or so to preserve the engagement at the extremes of movement. It is clear however that we might add, although quite uselessly, an additional length at the left-hand end in Fig. 4 where nothing opposes the ends of the racks, and also, quite uselessly, these additions might be of unequal amount. Also, we might add to the right-hand ends of the racks provided the driving lugs 48 were moved so that they would be at a corresponding distance further to the right when moved to their extreme left-hand limit under the influence of the cam, and in fact additions to the right-hand ends of the rack shown might be unequal in amount if the lugs 48 were correspondingly relatively displaced.

If the additions referred to were toothed, they would in a descriptive sense be parts of the racks. However it will be apparent that these teeth would not mesh with those of the pinion to drive the same or be driven thereby. Hence the portions which functionally constitute racks would be centered relative to the pinion when the parts were in the so-called neutral position illustrated by Fig. 4. Reference herein to the racks as centered will therefore be understood to refer to that portion of a physical structure which functions as a rack.

In the example of the invention shown, the actuators are driven from a power shaft 50 which, if it rotated continuously would simply move the actuators and the shaft and bring the shaft successively to its series of selected positions in regular recurrent order. The successive movements of the shaft might vary in angular amount and in angular direction. By means of a suitable interrupting device, however, the cycle is interrupted when a selected actuator has moved the racks driven thereby to centered position and the shaft is thereby brought to and held in a selected predetermined position.

The shaft 50 is herein a cam shaft having ranged around its periphery a series of angularly displaced intermittent cams or wipers 52, one opposing each of the actuators. Each cam has a nose 54 which moves into engagement with the vertical end surface of the actuator plate 36 as will be apparent by considering the actuators which appear at the rear in Fig. 4. As the shaft turns counterclockwise viewing that figure, the cam will urge the slider to the left as it wipes downwardly along this surface. Following the nose portion 54 of the cam is a circular portion 56 concentric with the axis of rotation which moves into engagement with a corresponding circular surface 58 at the lower end of the vertical end surface of the actuator which has just been referred to, as shown by the actuator in front in Fig. 4. The stroke of the actuator toward the left in that figure is thus completed and it remains stationary while the cam revolves for a short distance. This provides a period wherein the shaft may be stopped if this particular cam actuator and pinion correspond to the desired position of the shaft. If not, the cam rides clear, releasing the actuator and the next cam operates the next actuator and so on.

Referring now to Figs. 1 and 3, the cam shaft 50 is herein driven from an electric motor 60, which may be of the shaded pole type, through reducing gearing 62 as seen in Fig. 5, and a spring-pressed plunger 64 may bear against the side of one of the gears with a force adjustable by means of a screw 66. The motor thus runs against a constant brake which has been found a great advantage in the operation of the parts.

I have not attempted to show the electric wiring in the realistic Figures 1–7. The operation of the mechanism from the motor will be understood from the wiring diagram, Fig. 8. The mechanism is there shown as controlled by a suitable selective switch diagrammed as a bank of push buttons 1, 2, 3, 4, 5, one for each position of the shaft and controlling parallel circuits for energizing the motor. The motor drives an interrupter switch here embodying rotating conductive plates on the cam shaft, a front plate 68 and a rear plate 70, with which cooperate brushes unnecessary to identify by a reference numeral. Five brushes, each in series with one of the push buttons, equally spaced about the motor shaft make contact with the plate 70. This plate has a notch 72 and when one of the brushes enters the notch the motor energizing circuit is broken at this point. There is nothing essentially novel about this switch as such.

In Fig. 8 the shaft is stopped at position 3, corresponding to push button 3. Suppose now we wish to move to station 2. Push button 2 is depressed, energizing the motor. No means are here illustrated for keeping the push button in, it being assumed that the operator will keep it depressed manually until the new station is reached. I have herein shown signal lights 74, associated with each push button circuit, so that a lamp lights when push button 2 is depressed and the operator will keep the button down until the circuit is broken. When the motor stops the light will go out, and he will be informed that the new position of the shaft has been reached. The motor being energized through closed push button 2, plate 70 will begin to turn counterclockwise viewing the figure, the shaft 20 will be moved through position 4, position 5 and position 1, and then the notch 72 will come to the brush in the circuit of push button 2 and the motor will stop, with the corresponding cam 52 resting with its circular surface 54 engaging surface 56 of the corresponding actuator and the corresponding racks 34 centered on their pinion 32 as seen in Fig. 4.

To permit angular adjustment of the pinions 32 and shaft 30 so that the latter will be in desired angular position when a given pinion is turned by the action of its cam to the neutral rack-centered position of Fig. 4, and to permit alteration of these positions, releasable means is provided for connecting the pinions, which as already mentioned in and of themselves are free on the shaft, in driving relation to the same. Herein sleeves 80 are alternated with the pinions and the sleeves 80 are keyed to the shaft with freedom of longitudinal movement therealong by means of balls 82 at diametrically opposite points, which balls are received in V-shaped ways 84 axial of the shaft and V-shaped grooves 86 in the sleeves (see Figs. 5, 6 and 7). When the assemblage is axially clamped the gears and shaft move together. If the clamping pressure is relaxed the shaft may be rotated relatively to any pinion which is held fixed, as is the pinion shown in Fig. 4, by the racks 34 which rest against the lugs 48 of actuator A, in turn held by a cam 52.

Suppose we wish to adjust the position of the shaft so that actuation by a given pinion gives it the required angular adjustment. The pinion 32 is brought to rest with its corresponding actuator and cam 52 in the positions of Fig. 4. The axial clamping pressure of the pinions is released. The particular pinion in question cannot turn, being locked by one or the other of the racks abutting the lugs 48. The shaft may thus be turned within the pinion as by means of a wheel-like handle or knob 90 thereon (Fig. 1) to a new position. Thus, if we are concerned with a radio apparatus we might tune in a signal on a new frequency. After this is done the pinions are clamped against the sleeves 80 once again and therefore the return at any later time of this particular pinion to the same position will move the shaft to the new position of adjustment. During this readjustment the other racks meshing with the other pinions are unrestrained. Friction is sufficient to cause these pinions to turn with the shaft and to drive the racks so that the relative position of these other pinions to the shaft remains unaltered. Friction between the latter pinions and the interposed sleeves 80 keyed to the shaft, which friction is due to the pressure of spring washers 92 as hereinafter explained, is sufficient.

The parts are clamped (see Fig. 5), with attendant compression of the spring washers 92, by an adjusting nut 94 threaded onto the end of the shaft 20 and turned by knob 96 (Fig. 1). The washers bear against the outer race 98 of a ball thrust bearing, the inner race 100 of which is carried by a sleeve 102, which also carries the inner race of the forward journal bearing. A member 104 at the inner end of this sleeve presses against the forward end of the stack of sleeves 80 and pinions 32 which stack is supported at the rear by a sleeve 106 bearing against a shoulder 108 on the shaft. The entire mechanism turns freely with the shaft during normal use. There is no tendency to disturb the angular relation of the parts when the nut 94 is turned. Any drag of the nut is absorbed by the free race 98. When the nut is backed off the washers as explained above still maintain sufficient pressure on the stack of pinions and washers so that, with the exception of the one positioned by the cam, they will turn as a unit with the shaft when the latter is turned within the one so held.

The actuators A, as already described, comprise two plates 36 and 38 connected by springs 46. The former drives the latter through the springs. Thus, referring to Fig. 4, when the plate 36 was moved to the left to the position shown, springs 47 anchored to the plate at their left-hand ends acted as tension connections to draw plate 38 also to the left. If the springs did not yield or what amounts to the same thing if the plates 36 and 38 were in one piece it would be theoretically possible to have an apparatus operating as hereinbefore described. However for practical reasons a lost motion is provided between the cam follower plate 38 and the racks 34 in the centered position of the latter. When both racks abut lugs 48 on plate 36 and the driven pinion is in its desired position, plate 36 can no longer move to the left. The cam is so designed that it may move plate 38 a further short distance, extending springs 47 and moving lug 44 to the left in slot 46. Hence minor inaccuracies of construction, looseness of the parts, and the effects of wear are taken care of. Also, when the shaft is position with one of the pinions locked as indicated in Fig. 4, a slight manual movement may be effected by means of the knob 90 useful in checking the accuracy of the adjustment. The parts return automatically under the action of the springs after such manual movement.

As best seen in Fig. 4 the plate 38 may be provided with slight embossed projections 110 which extend over the ends of the racks 34 and prevent their displacement from the grooves which receive them when the racks are moved to extreme positions.

I also show (see Figs. 1, 2 and 4) a leaf spring 112 secured to bottom guide plate 18, having a number of projecting tongues 114 which extend over the edge of this plate and are adapted to be engaged by the edge of plate 38 of the actuator when the actuator is moved from the "in" position to the "out" position of Figs. 2 and 4. The parts as they move to and when they are in the position shown in Fig. 4 are thus firmly held and there is no undesirable looseness.

In Figs. 9 and 10 I show a modification of the actuator and the driving means therefor which in a sense may be considered as providing for an inversion of the movements of those parts in the other figures. In the modification of Figs. 1 to 7 just described, the actuators are normally drawn to neutral or idle position toward the right in Fig. 4 by springs 42. The cams 52 push them to the left and the centered position of the parts corresponds (subject to what has been said concerning the action of springs 47) to the high point or nose of the cam. In the modification as illustrated by the nearer actuator seen in Fig. 10 on the contrary the actuators are held in the idle position against a spring by the action of a circular portion of a cam which has an eccentric portion extending inwardly to a low point and the actuator is by this eccentric portion released to the action of the spring and moved thereby to an extreme position wherein the racks are centered as seen in Fig. 9.

Referring to the figures the shaft 20, pinions 32 and racks 34 are like those in Figs. 1 to 7 and are similarly positioned and arranged for cooperation. The actuator comprises a single plate 136 similar to plate 36 and similarly mounted, and it has lugs 144 for engaging the ends of the racks 34 but these are at the end of the plate which is at the opposite side of shaft 20 from cam shaft 50. Springs 142 normally tend to draw the actuators 136 to the right in the case of the nearer actuator in Fig. 9 into an extreme position wherein lugs 144 engage the ends of the racks and move them to centered position in the sense already explained. The plates 136 have followers 137 projecting therefrom cooperating with cams 152 on the cam shaft 50, one for each actuator.

Each cam 152 is a disc circular for the greater portion of its circumference, but having an eccentric portion 153 defining a sharp drop to a low point 155 at which the cam surface may be circular for a short distance and from which it continues as a rise 157 to the exterior circular surface first mentioned. The cam has the general form of a circular disc with a notch or depression of limited circumferential extent defining a low point. These depressions are angularly offset in the several cams of the system.

As the cam shaft turns the follower 137 of one of the actuators riding along on the outer circumferential edge of its cam 152 will come to the eccentric portion 153 which will release the actuator to its spring 142 which quickly draws it to the right to the position of Fig. 9 as seen at the front of the figure. For a short period the follower is opposite surface 155. Then the surface 157 returns the follower to the circular periphery of its cam to the position shown in the front of Fig. 10. The depressions in the cams occupy separate segments of the circular area about cam shaft 50 so the several actuators are reciprocated in recurrent sequence. The motor is stopped at a selected position as in the other modification when the pertinent actuator has its follower at low point 155 of its cam.

In the extreme position of the plate wherein its movement is stopped by the simultaneous engagement of lugs 144 with both racks 34 a clearance is provided between the follower 137 and the low point 155 of the cam and between the lug 149 to which spring 142 is anchored and the plate 18. The actuator thus is always spring driven to the desired extreme position corresponding to the centered position of the racks. No auxiliary plate similar to 38 in the other modification is required.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. Shaft positioning apparatus comprising a shaft having a series of gears thereon, racks meshing with each gear at opposite sides thereof, a sliding rack actuator for each gear, a cam shaft having a cam for each actuator, each cam being shaped to provide for movement of the actuator to an extreme position during which movement it drives the racks and for its return from such position to an idle position, both in a limited angular movement of the cam shaft, the cams being angularly offset to provide for such movement of the actuators in regular recurrent order on complete rotations of their shaft, a motor driving the cam shaft, a plurality of manually controlled switches corresponding to the cams each controlling a circuit for energizing the motor and an interrupter switch rotating in tuned relation to the motor to break such circuits when the corresponding cam has caused movement of its actuator to its extreme position.

2. Shaft positioning apparatus comprising a shaft, a series of drivers carried thereby with provision for selective angular positioning of the same thereon, motion-transmitting devices connected to said drivers to move the latter and to be moved thereby in relatively opposite directions, a series of actuators apposing the devices of the several drivers, a cam shaft having cams with angularly offset portions which move, when the shaft revolves, in regular recurrent order into effective apposition to said actuators to provide for their movement into engagement with a motion-transmitting device which has been moved toward such cam and for the return of the two motion-transmitting devices to neutral position, a motor driving the cam shaft and means for energizing the same comprising a selector switch and a cooperating interrupter switch driven from the motor to cause rotation of the motor and stopping of the same when a selected cam has acted.

3. Shaft positioning apparatus comprising a shaft, a series of drivers carried thereby with provision for relative angular adjustment, actuators operatively related to the drivers respectively for moving the latter, a cam shaft having a series of cams one for each of the actuators, the cams being shaped to provide for movement of the latter to an extreme position and thereby for movement of the drivers and for the return of the actuators to idle positions in regularly recurrent order as the cam shaft revolves, a non-reversing motor driving the cam shaft and means for energizing the same comprising a selector switch mechanism controlling circuits corresponding in number to the number of actuators and a cooperating interrupter switch turning in time relation to the cam shaft to break said circuits respectively when the corresponding cam has caused movement of the actuator to its extreme position.

4. Shaft positioning apparatus comprising a shaft, a series of drivers carried thereby, actuators operatively related to the drivers respectively for moving the latter, a cam shaft having cams for each actuator for successively moving the same as the shaft revolves, each cam having a nose portion and the actuator a portion engaged thereby to provide for movement of the actuator and the cam and actuator also having circular portions of limited extent which engage subsequent to such movement to maintain temporarily the actuator in the position to which it has been moved during a limited continued motion of the cam, a motor driving the cam shaft and means for energizing the same comprising a selector switch and a cooperating interrupter switch driven from the motor effective to break the motor circuit during the period of engagement of said circular portions.

5. Shaft positioning apparatus comprising a shaft, a series of drivers carried thereby, actuators operatively related to the drivers respectively for moving the latter, a cam shaft having cams for each actuator for successively moving the same as the shaft revolves, each cam having a nose portion and the actuator a portion engaged thereby to provide for movement of the actuator, a motor driving the cam shaft, means for energizing the motor comprising a selector switch and a cooperating interrupter switch driven from the motor effective to break the motor circuit when the cam nose portion has completed its action on its related actuator and a mechanical brake constantly opposing the rotation of the motor.

6. Shaft positioning apparatus comprising a shaft, a series of drivers carried thereby, actuators operatively related to the drivers respectively for moving the latter, a cam shaft having cams, one for each actuator, for successively moving the actuators as the shaft revolves, each cam having an eccentric portion and the actuator a follower cooperating with the same, the eccentric portions of the several cams being ranged in angularly spaced positions about the shaft, a motor driving the cam shaft, means for energizing the motor comprising a selector switch and a cooperating interrupter switch driven from the motor effective to break the motor circuit when the eccentric portion of a cam has completed its action on its related actuator and a mechanical brake constantly opposing the rotation of the motor.

7. Shaft positioning apparatus as in claim 4 wherein a mechanical brake constantly opposes rotation of the motor.

8. Shaft positioning apparatus comprising a shaft having a series of drivers thereon, reciprocating actuators operatively related to said drivers respectively, springs for returning the actuators to an initial position and means for moving each actuator comprising an intermittent cam, manually controlled means for traversing the cam past the end of an actuator, the cam having a nose portion and the actuator having a portion engaged thereby to provide for movement of the actuator against the force of the spring from such initial position, the cam and actuator having circular portions of limited extent which engage subsequently to such movement, and means for releasing and for effecting the circumferential driving connection of the drivers to the shaft whereby the angular position of the shaft to the driver may be altered while said circular portions are in engagement.

9. Shaft positioning apparatus comprising a shaft having a series of pinions thereon, loose racks meshing with each pinion at opposite sides of the latter, a reciprocating actuator for each pinion having abutments at one side of the shaft for engaging the ends of the racks, means for normally positioning the actuator with said abutments at least as far from the shaft as the extreme position of the end of a rack moved toward that side and means for moving any selected actuator to and retaining it in a position wherein the racks are centered relative to the pinion, the actuator comprising two parts, one engaging the racks and the other connected to the first through a yielding driving connection permitting continued movement of the said other part after the first has engaged the racks.

10. Shaft positioning apparatus comprising a shaft having a series of pinions thereon, loose racks meshing with each pinion at opposite sides of the latter, a reciprocating actuator for each pinion having abutments at one side of the shaft for engaging the ends of the racks, means for normally positioning the actuator with said abutments at least as far from the shaft as the extreme position of the end of a rack moved toward that side, a cam shaft having a series of intermittent cams ranged about its circumference and apposing the actuators respectively for engaging the actuators respectively and moving them to positions wherein the racks are centered relatively to the pinion whereby rotation of the shaft to a selected angular position will move the racks of a predetermined pinion to such centered position with resultant angular positioning of the pinion shaft.

11. An apparatus as defined in claim 10 wherein the actuator comprises two parts, one engaging the racks and the other being a cam follower connected to the first through a yielding driving connection permitting continued movement of the said other part after the first has engaged the racks.

12. Shaft positioning apparatus comprising a shaft having a series of pinions thereon, loose racks meshing with each pinion at opposite sides of the latter, a reciprocating actuator for each pinion having abutments at one side of the shaft for engaging the ends of the racks, means for normally positioning the actuator with said abutments at least as far from the shaft as the extreme position of the end of a rack moved toward that side, a cam shaft having a series of cams one for each actuator for successively moving the actuators as the shaft revolves each cam having an eccentric portion and the actuator a follower cooperating therewith, the eccentric portions of the several cams being ranged in angularly spaced positions around the shaft, the cooperation of said eccentric portions and followers providing for movement of the actuators to positions wherein the racks are centered relatively to the pinion whereby rotation of the shaft to a selected angular position will move the racks of a predetermined pinion to such centered position with resultant angular positioning of the pinion shaft.

RICHARD W. MAY.

REFERENCES CITED

The following references are of record in the file of this patent:

UNITED STATES PATENTS

| Number | Name | Date |
|---|---|---|
| 1,851,571 | Doman | Mar. 29, 1932 |
| 1,868,385 | Greenwood | July 19, 1932 |
| 2,197,155 | Nardone | Apr. 16, 1940 |
| 2,277,134 | Nelson | Mar. 24, 1942 |
| 2,296,060 | Schwarz et al. | Sept. 15, 1942 |
| 2,305,326 | Swallow | Dec. 15, 1942 |
| 2,384,561 | Muffett | Sept. 11, 1945 |
| 2,410,091 | Lynch | Oct. 29, 1946 |
| 2,444,840 | May | July 6, 1948 |
| 2,480,373 | Leishman | Aug. 30, 1949 |
| 2,488,866 | Illmer | Nov. 22, 1949 |
| 2,560,015 | Waldron | July 10, 1951 |
| 2,571,303 | Spiller et al. | Oct. 16, 1951 |